2,849,434

S-(1,2-DICHLOROVINYL)-GLUTATHIONE AND METHOD FOR ITS PREPARATION

Arthur C. Eldridge, Morton, and Leonard L. McKinney, Peoria, Ill., assignors to the United States of America as represented by the Secretary of Agriculture No Drawing. Application January 22, 1958
Serial No. 710,589

4 Claims. (Cl. 260—112)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a new chemical compound S-(1,2-dichlorovinyl)-glutathione which may also be designated as S-(1,2-dichlorovinyl)-γ-glutamylcysteinylglycine. This invention also relates to a novel method for its preparation. The compound has the following formula:

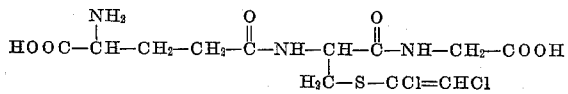

It is a crystalline compound, slightly soluble in water and difficultly soluble in organic solvents.

The new compound possesses properties which render it useful as a specific and efficient fungicide. Aqueous solutions containing a concentration of only 10 parts per million of the compound were found to be effective in inhibiting the growth of the yeast species *Saccharomyces pasteurianus*, whereas aqueous solutions containing a concentration of 200 and 300 parts per million of the compound, respectively, would not inhibit growth of the saprophytic mold *Mucor ramannianus* or the bacteria *Sarcina lutea*.

The new compound also is effective as an algaecide, and prevents the growth of algae in water when it is present in a concentration of about 100 parts per million.

The compound is prepared by reactions which may be shown schematically as follows:

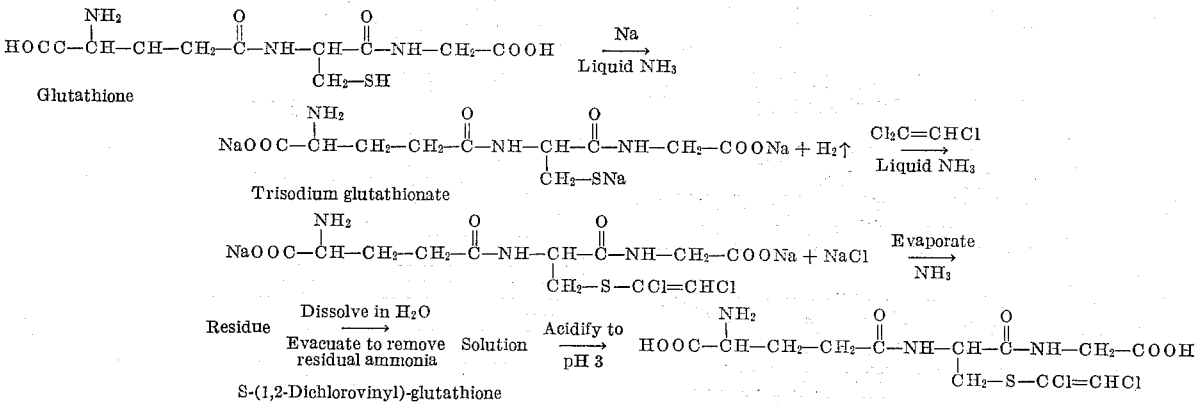

The trisodium salt of glutathione is made by adding glutathione to liquid ammonia in which an equivalent amount of sodium metal has been dissolved or three moles of sodium per mole of glutathione use. Since sodium forms a blue solution when dissolved in liquid ammonia, the correct amount of glutathione may be determined by adding it to the ammoniacal solution until the blue color disappears. Hydrogen gas is liberated while the trisodium glutathionate is being formed. Approximately one mole of trichloroethylene per mole of the trisodium glutathionate is then added slowly to the liquid ammonia solution. The trichloroethylene may be added more rapidly if it is precooled by solid carbon dioxide or diluted with liquid ammonia or any other inert solvent such as acetone. The reaction product, disodium S-(1,2-dichlorovinyl)-glutathionate is soluble in liquid ammonia. After the liquid ammonia has been slowly evaporated off, a white to light tan residue is left which contains primarily the disodium salt of S-(1,2-dichlorovinyl)-glutathione and sodium chloride. Since both of these products are soluble in water, the reaction mixture is dissolved in water, and the residual ammonia is removed by vacuum. Then successive portions of acetic and hydrochloric acid is added until a pH reading of 3 is obtained. S-(1,2-dichlorovinyl)-glutathione, which is soluble in water, is formed. Absolute alcohol is added in the ratio of 4 volumes to one of the solution and the resulting mixture is placed in a refrigerator at 0° to 30° C. for several days. The crude product which slowly precipitates may contain traces of unreacted glutathione, which can be removed by recrystallization of the product. When present, the oxidized form of glutathione can be removed by treatment with potassium cyanide and recrystallization from alcohol-water solutions.

The yield of crude product based on the original glutathione used is approximately 70 percent. The purity of the product is easily determined by paper chromatography using 70:30 n-propanol-water giving a ninhydrin positive spot at $R_f$ 0.43–0.46. The spot also gives a blue color with 4-(p-nitrobenzyl)-pyridine to distinguish it from other amino acids and polypeptides. The spot can also be detected under ultraviolet light because the compound exhibits a maximum absorption at 260 millimicrons with a molecular extension coefficient of 3,400. This absorption is characteristic of a vinyl group adjacent to a sulfur atom and is evidence of the structure of the compound. The spot also gives a positive test for sulfur by the iodoplatinic acid reagent.

The following example is illustrative of the methods of carrying out the invention.

EXAMPLE

Sodium metal and dry reduced glutathione were added separately in portions to 500 ml. of liquid ammonia at −33 to −50° C. while stirring. The sodium (approximately 0.7 gm.) was added first, to give the characteristic blue color and then a portion of reduced glutathione was added until the blue color disappeared, indicating that the trisodium salt of glutathione had been formed. A total of 3.07 gm. (0.01 mole) of glutathione was added. Trichloroethylene 1.8 ml. (0.02 mole) was diluted with 50 ml. liquid ammonia and added slowly to the reaction mixture with continued stirring. After two hours the liquid ammonia was allowed to evaporate leaving a white to light tan residue. This residue was dissolved in 50 ml. of water and a vacuum applied to remove the residual ammonia. The pH was noted as 9.4. The pH was adjusted to 5.0 with acetic acid, then from pH 5.0 to pH 3.0 with 3 N hydrochloric acid. Four volumes of absolute alcohol were added to the solution, and the turbid mixture containing the product was allowed to stand at 0° to 30° C. for three days, and then filtered.

The crude precipitate 2.8 gm. was dissolved in 75 ml. 50 percent alcohol at 70° C. and the solution was clarified with 0.25 gm. activated carbon by filtering the suspension while hot. The clear filtrate was allowed to cool slowly whereupon clusters of needles were formed. The clear supernatant and crystals were kept at 0° to 30° C. overnight and the crystals filtered off. The crystallized product (2.4 gm.) was isolated. A second crystallization was carried out in the same manner using 70 ml. of 50 percent alcohol at 70 C. Needled clusters (2.0 gm.) were isolated.

Chromatography of these crystals in 70:30 n-propanol-water on Whatman No. 1 filter paper showed traces of the oxidized form of glutathione. This form of glutathione was removed by dissolving the 2.0 gm. of material in 70 ml. of 50 percent alcohol at 70° C. and then adding 0.25 gm. of potassium cyanide. The solution was cooled slowly then placed under refrigeration and allowed to stand overnight. Needle clusters (1.8 gm.) were isolated, which was 45 percent of the theoretical yield for the reaction based on the starting reduced glutathione. The crystals melted at 199–201° C. with decomposition and were pure as determined by paper chromatography. The elementary analyses agreed with that for S-(1,2-dichlorovinyl)-glutathione:

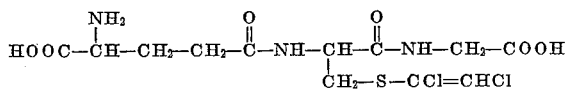

The amount of sodium chloride in the mother liquor was determined. It was found that 0.467 gm. of sodium chloride was liberated which corresponds to 0.008 moles, or 80 percent of the theoretical based on 100 percent yield which agrees favorably with the 70 percent actually isolated.

ANALYSES

|  | C | H | N | S | Cl |
|---|---|---|---|---|---|
| Cal'd | 35.84 | 4.23 | 10.45 | 7.97 | 17.64 |
| Found | 36.6 | 4.40 | 10.29 | 8.2 | 17.90 |

Solubility; gm. per 100 ml. $H_2O$, $3.1^{4°}$; 50% EtOH, $3.4–3.5^{70°}$; $0.4–0.5^{3°}$. Ultraviolet absorption; $\lambda$ max 260 m$\mu$; $\epsilon = 3,400$.

The following examples show the efficiency of the new compound as a fungicide and algaecide.

*Example 1.*—The fungicidal activity of S-(1,2-dichlorovinyl)-glutathione was tested with a saprophytic mold (*Mucor ramannianus*), and a yeast (*Saccharomyces pasteurianus*).

The tests were carried out by adding an aqueous solution of the compound to paper discs of 12.5 millimeters in diameter and placing the discs on an inoculated agar medium in a Petri dish. The dishes were then incubated at 30° C. for 24 hours and examined for inhibition of fungus growth. In this test the clear agar medium became cloudy or opaque because of fungus or mold growth. The area around and under the disc remained clear when growth of the microorganism was inhibited, because of the diffusion of the fungicide into the agar medium. Fungicidal activity was determined by measuring the diameter of the zone of inhibition, and the measurement included the diameter of the paper disc because inhibition occurred under the disc as well as around it.

The fungicidal activity of S-(1,2-dichlorovinyl)-glutathione as determined by the disc assay procedure is shown in Table I.

Table I

| Micrograms added to 12.5 millimeter paper disc | Diameter of zone of inhibition in millimeters | |
|---|---|---|
|  | *Mucor ramannianus* mold | *Saccharomyces pasteurianus* yeast |
| 0.0 | None | None |
| 1.0 | None | 18 |
| 2.5 | None | 22 |
| 5.0 | None | 28 |
| 7.5 | None | 28 |
| 10.0 | None | 30 |
| 15.0 | None | 35 |
| 20.0 | None | 37 |

S-(1,2-dichlorovinyl)-glutathione failed to inhibit the growth of the microorganisms shown in Table II.

Table II

| Microorganism | Diameter of zone of inhibition in millimeters with 20.0 micrograms added to 12.5 millimeter disc |
|---|---|
| *Aspergillus niger* | None |
| *Trichoderma viridae* | None |
| *Bacillus subtilis* | None |
| *Sarcina lutea* | None |

*Example 2.*—S-(1,2-dichlorovinyl)-glutathione was tested as an algaecide. A control flask containing 100 ml. of water and a serial dilution of S-(1,2-dichlorovinyl)-glutathione in flasks containing 100 ml. of an aqueous solution were set at room temperature (25°–30° C.) in the sunlight. To the control flask and flasks containing the new compound at pH 6.5 was added fish meal and soybean flour as nutrients. All flasks were then inoculated with 5 ml. of water which was green with algae growth.

The flasks were observed for a period of ten days. The control flask with water only became green with algae growth within four days. The remaining flasks had a decreasing green color with increasing concentration of the compound. After ten days the supernants of each flask were decanted carefully and the optical densities of each solution were read at 540 millimicrons. The results are shown in Table III.

Table III

| Concentration (parts per million) | Optical density at 540 millimicrons |
|---|---|
| 300 | 0.001 |
| 200 | 0.003 |
| 100 | 0.003 |
| 50 | 0.027 |
| 25 | 0.073 |
| 10 | 0.101 |
| Control | 0.168 |

As can be seen from the results shown in Table III S-(1,2-dichlorovinyl)-glutathione has algaecidal properties when the concentration of the compound is 100 p. p. m. or greater. In other words, as shown by the optical density, there was very little, if any, algae growth in mediums containing more than 100 p. p. m. of S-(1,2-dichlorovinyl)-glutathione.

We claim:
1. S-(1,2-dichlorovinyl)-glutathione.
2. A method comprising reacting glutathione with an alkali metal in liquid ammonia to form trialkali metal glutathionate, reacting the trialkali metal glutathionate with a stoichiometric amount of trichloroethylene to produce dialkali metal salt of S-(1,2-dichlorovinyl)-glutathione, and acidifying the dialkali metal salt of S-(1,2-dichlorovinyl)-glutathione with non-oxidizing acid to produce S-(1,2-dichlorovinyl)-glutathione.
3. The method of claim 2 in which the alkali metal is sodium.
4. A method comprising reacting glutathione with sodium in liquid ammonia to form trisodium glutathionate, reacting the trisodium salt with one molecular equivalent to trichloroethylene, to produce disodium salt of S-(1,2-dichlorovinyl)-glutathione and acidifying the disodium salt of S-(1,2-dichlorovinyl)-glutathione to about pH 3.0 to produce S-(1,2-dichlorovinyl)-glutathione.

No references cited.